Jan. 2, 1940.  J. F. NIELSEN  2,185,562

MOUNTING FOR ELECTRICAL APPARATUS

Filed Aug. 11, 1936  2 Sheets—Sheet 1

INVENTOR
JOHN F. NIELSEN
BY W. W. Beatty
ATTORNEY

Jan. 2, 1940.  J. F. NIELSEN  2,185,562
MOUNTING FOR ELECTRICAL APPARATUS
Filed Aug. 11, 1936   2 Sheets-Sheet 2
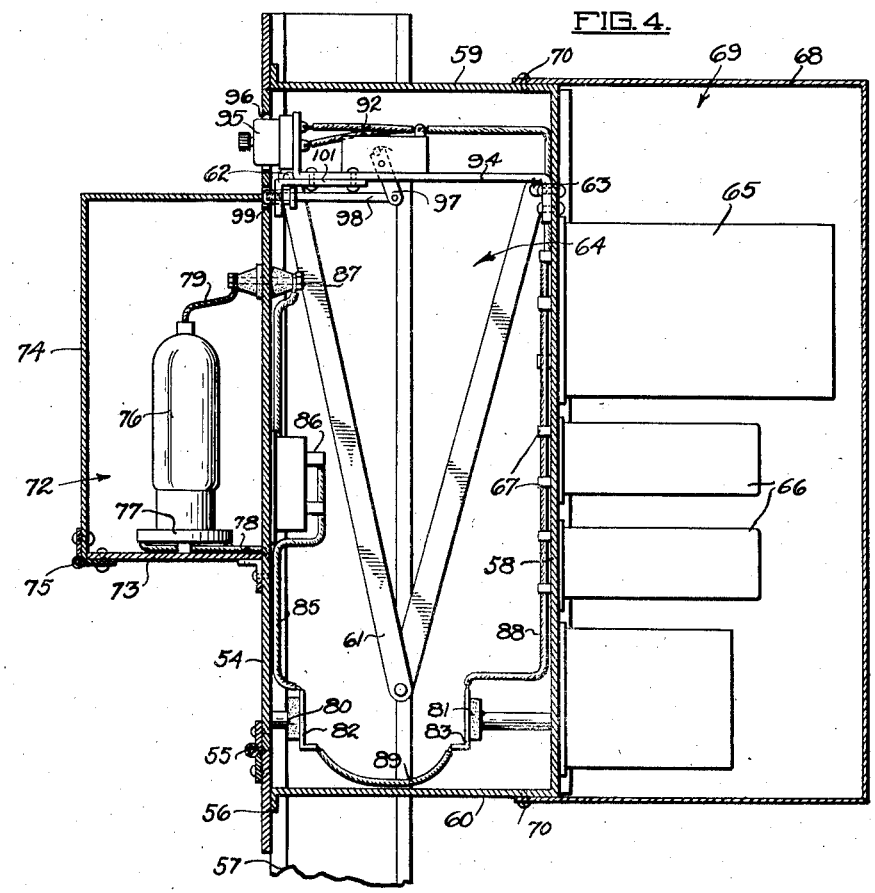
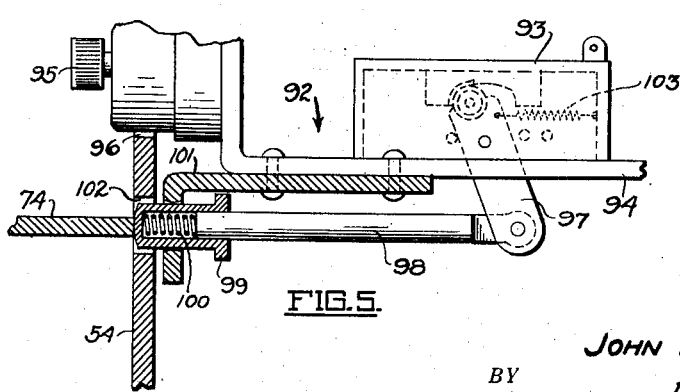
INVENTOR
JOHN F. NIELSEN
BY
W. G. Beatty
ATTORNEY Patented Jan. 2, 1940

2,185,562

UNITED STATES PATENT OFFICE 2,185,562

MOUNTING FOR ELECTRICAL APPARATUS

John F. Nielsen, Hollywood, Calif., assignor, by mesne assignments, to Radio Corporation of America, New York, N. Y., a corporation of Delaware Application August 11, 1936, Serial No. 95,421

7 Claims. (Cl. 250—16)

This invention relates to electrical apparatus and has particular reference to a mounting for supporting vacuum tube amplifier units and the like.

In the usual amplifier equipment used in radio communications, theatres, etc., various elements such as transformers, choke coils, etc., which generate stray magnetic fields exteriorly thereof as well as such elements as vacuum tubes and coils which may be deleteriously affected by these stray magnetic fields have heretofore been magnetically shielded by providing individual shielding members over each of the elements or by placing various groups of elements in separate shielded compartments in the mounting or support therefor. This practice increases the cost of the construction and assembly and also prevents ready accessibility.

One object of the present invention is to prevent magnetic fields produced by certain elements of an electrical apparatus from deleteriously affecting other elements of the apparatus.

This is accomplished by providing a plurality of spaced panels, one of which carries elements capable of producing exterior magnetic fields and the other or others of which carry the elements susceptible of being affected by such magnetic fields. The magnetic field producing elements are provided on the opposite face of the panel therefor from the panel or panels carrying the elements susceptible of the stray magnetic field. The first mentioned panel is formed of sheet iron, steel or other material of high magnetic permeability. Preferably a cover, also of a material of high magnetic permeability is attached to the face of the sheet iron or steel panel, covering the elements thereon, thus forming an enclosed shield for the magnetic lines of force produced by such elements. The panel carrying the elements of the electrical apparatus which are susceptible to being deleteriously affected by stray magnetic fields, is preferably composed of Bakelite, Duralumin or other material having a relatively low magnetic permeability, thus decreasing the tendency of any stray magnetic fields from being attracted thereto.

Another object of the invention is to increase the accessibility of electrical apparatus in a mounting arrangement.

This is accomplished by providing a pair of panels, carrying the various elements in the electrical apparatus, in spaced and parallel relation, with the apparatus thereon carried on the outer faces of each panel. The electrical terminals for these various electrical elements extend through to the opposite or adjacent faces of these two panels. One of the panels is hinged adjacent one edge thereof, preferably the lower edge, to allow accessibility, when moved about its hinging axis, to the terminal sides of both of the panels. A pair of terminal blocks are provided adjacent the hinged axis of the last mentioned panel. One of the terminal blocks is carried by the hinged panel and has terminals thereon electrically connected to the various terminals of the elements on this hinged panel. The other terminal block has the terminals thereof electrically connected to the terminals of the apparatus on the other of the panels. Flexible electrical conductors are provided between the two terminal blocks to interconnect the various desired electrical elements of the two panels.

A further object of the invention is to reduce the floor space required by a mount for an electrical apparatus.

This is accomplished by providing the various panels carrying the various elements of an electrical apparatus in spaced, normally parallel, relation, these panels being removable from the same side of the apparatus mounting. This arrangement obviates the necessity of providing space between the rear of the apparatus mount and other apparatus or walls for removal of any apparatus from the rear.

More particularly describing the invention, reference is had to the accompanying drawings wherein:

Fig. 4 is a sectional elevational view through a modified form of the invention.

Fig. 5 is an enlarged fragmentary view showing the safety switch mechanism of Fig. 4.

Figure 1:
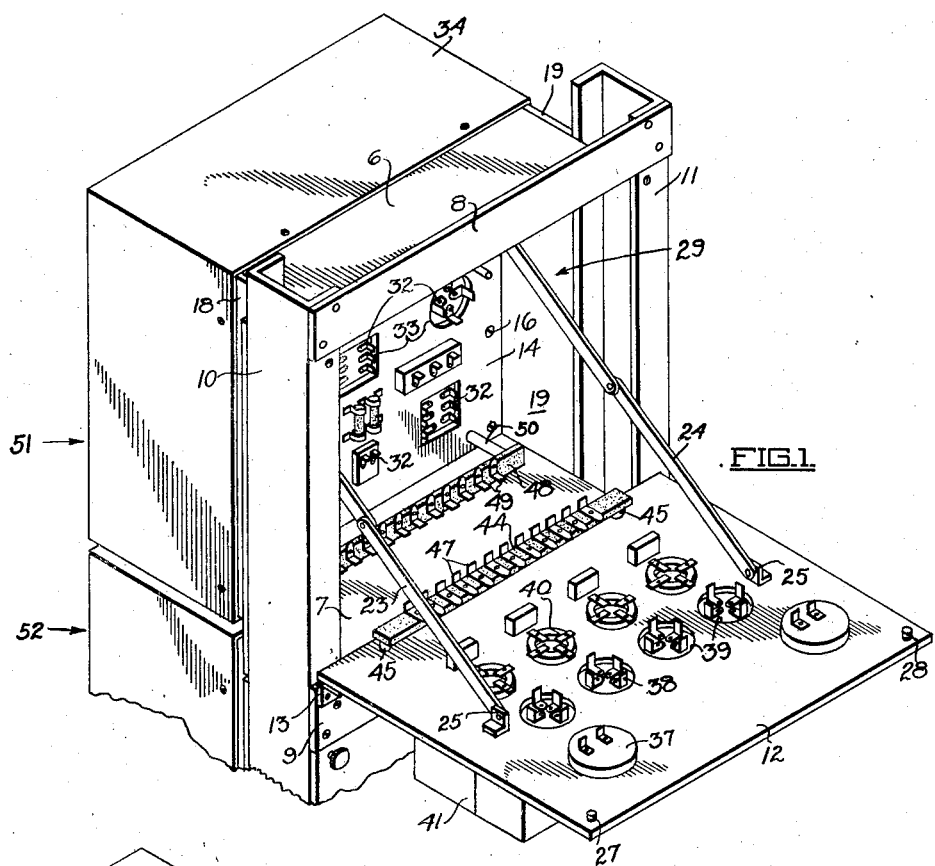
Fig. 1 is a perspective view of an amplifier mount showing the front panel in open position.
Figure 2:
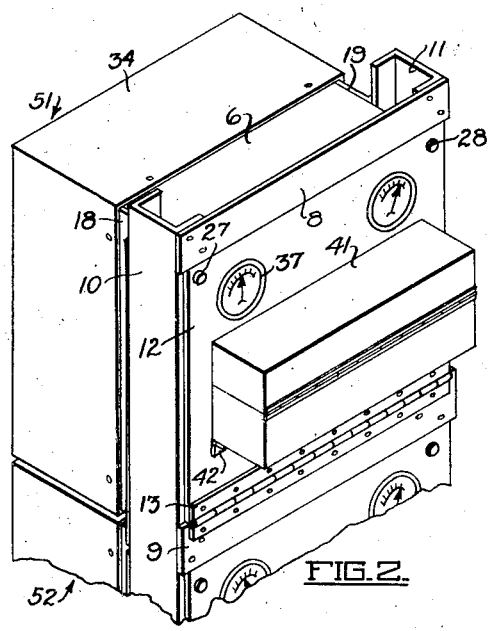
Fig. 2 is a perspective view, similar to that of Fig. 1, with the front panel thereof in closed position.
Figure 3:
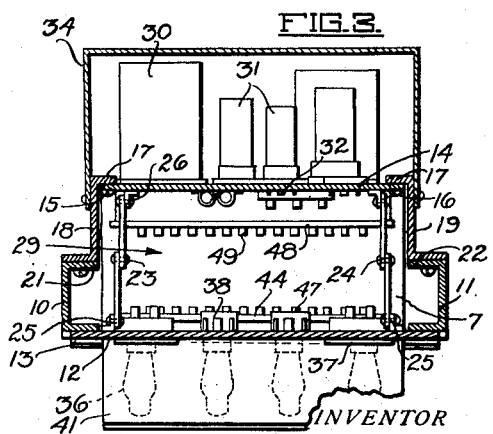
Fig. 3 is a sectional plan view of the amplifier mount shown in Figs. 1 and 2.

Referring now to Figs. 1 to 3, the amplifier mount comprises a pair of spaced vertical channel members 10 and 11. The flanges of each of the members 10 and 11 project inwardly toward the other member. A front panel 12 is supported by a hinge 13, adjacent its lower edge, on a cross piece 9 carried by the front flanges of the panels 10 and 11 to allow panel 12 to be swung into a horizontal position as shown in Fig. 1. A rear or base panel 14 is provided in spaced relation with the front panel 12 and is secured by bolts as at 15 and 16 to the front sides of flanges 17 formed on Z-shaped members 18 and 19. These members 18 and 19 are suitably secured to the rear flanges 21 and 22 of the members 10 and 11. Two pairs of spaced folding links 23 and 24 are provided to maintain the panel 12 in a horizontal position when opened, each being hinged at one end 25 thereof to the front panel 12 and at the other end 26 thereof to the rear panel 14 (Fig. 3). A pair of locking screws 27 and 28 are provided along the upper edge of panel 12 and are adapted to be threadably received in co-extensive threaded holes in the front flanges of members 10 and 11 to maintain panel 12 in a closed position.

The panels 12 and 14 forming, when in closed position, a terminal compartment 29, preferably carry thereon the elements comprising a single amplifier unit. A pair of horizontally extending flanges 6 and 7 are formed at the upper and lower edges of the panel 14, the flanges extending adjacent cross pieces 8 and 9. The elements of the power pack, or power supply unit for the amplifier, excepting the vacuum tube sockets therefor, which are capable of producing stray magnetic lines of force exteriorly thereof such as transformers, choke coils, relays, etc., as diagrammatically indicated at 30 and 31, are preferably all provided on the back face of panel 14. The various terminals 32 of these elements 30, 31, etc., extend through apertures 33 formed in the panel 14 to the opposite or inner face thereof. Panel 14 is formed of sheet iron, soft steel, or other material which has a high magnetic permeability. A dust cover 34 substantially enclosing the entire back face of panel 14, carrying the elements 30, 31, etc., is provided, which dust cover is also preferably formed of sheet iron or other highly magnetically permeable material so as to form a completely enclosed shield for elements 30, 31, etc.

With reference to Fig. 3 it is to be noted that the base panel 14 is of narrower width than the distance between the inner flanges of the members 10 and 11 or any other side wall forming members such as the web portions of the Z-shaped members 18 and 19, thus allowing the removal of this panel 14 from the same side of the mount as the front panel 12. To facilitate removal of panel 14 the upper cross piece 8, extending between members 10 and 11, may be removed.

The hinged panel 12, carries the vacuum tubes 36 and tube coupling coils (not shown) comprising the amplifier unit. Meters 37 and other elements which are susceptible of being affected by any stray magnetic fields such as may be produced by the elements 30 and 31 are carried on the back face of the panel 14. The vacuum tubes (not shown) of the power pack, or power supply unit are also carried by the hinged panel 12. These tubes 36 and meters 37 extend outwardly from the front or outer face of panel 12 and have the terminals 38 thereof extending through apertures 39 of panel 12 to the inner or terminal side thereof. Panel 12 is formed of Duralumin or other relatively low magnetically permeable material to reduce the tendency of the stray magnetic fields produced by the elements 30 and 31 from being attracted thereto and thus affecting the elements thereon. Tubes 36 and coils (not shown) whose terminals 40 also extend into the terminal face or side of panel 12, are enclosed by a cover 41 at the front of panel 12 which is suitably hinged at 42 on the lower edge thereof to permit access to these various tubes and coils.

A terminal block 44 of Bakelite or other insulated material, is supported in spaced relation to the front panel 12 by means of spacers 45 adjacent the lower edge thereof. A plurality of terminals 47 are provided along the block 44 and are connected to wires (not shown) to the various electrical terminals 38 and 40 extending on the terminal side of the panel 12. A second terminal block 48, similar to that of 44 and having terminals 49 secured thereto, is supported in spaced relation with the base panel 14 by means of spacers 50. These various terminals 49 are electrically connected by means of suitable wires (not shown) to the various terminals 32 of the members 30, 31, etc., extending from the terminal or inner side of panel 14. Flexible electrical connections, such as wires (not shown) are provided between the terminals 47 on block 44 and terminals 49 on block 48. Preferably the various connections between the terminals of each of the terminal blocks and the terminals on their respective panels are so arranged that the corresponding ones of the terminals 47 and 49 which are to be interconnected, are directly opposite each other, thus preventing crossing of any of the flexible connections between the two terminal blocks 44 and 48.

From the above construction, it will be noted that access to all parts of the electrical apparatus may be had from the front of the mount or rack, thus saving floor space to the rear of the mount. Further, all of the apparatus may be tested and repaired from the same side of the mount while having the various meters also available at the same side. A further feature resides in the accessibility of the electrical conductors between the terminals of the various elements of the electrical apparatus.

As shown in Figs. 1 and 2 the supporting members 10 and 11 may support a plurality of separate amplifier units, one above the other as at 51 and 52.

Referring now to the modified form of amplifier mount shown in Figs. 4 and 5, the front panel 54, similar to that of 12 in Figs. 1 to 3, is hinged at 55 to a cross member 56 supported by a pair of spaced channel members, similar to 10 and 11, one of which is shown at 57. A base panel 58, similar to that of 14, is carried by a pair of Z-shaped members (not shown) similar to those of 18 and 19 (Fig. 3). Upper and lower horizontally extending flanges 59 and 60 are formed on the panel 58 to provide a substantially enclosed terminal compartment 64. A pair of hinged links at either side of the compartment 60, one of which is shown at 61, is hinged at one end 62 to the front panel 54 and at the other end 63 to the rear panel 58 to hold the front panel 54 in a horizontally extended position when opened. As in the mount illustrated in Figs. 1 to 3 the base panel 58 carries at its rear face thereof the transformers, choke coils, etc., as diagrammatically indicated at 65 and 66 and other elements of the particular electrical apparatus supported by panels 54 and 58, which are capable of producing stray magnetic fields of force exteriorly thereof. The terminals 67 of these various elements 65 and 66 extend through the panel 58 to the opposite or terminal side thereof. The panel 58 is formed of a relatively high magnetically permeable material such as sheet iron and forms, with a dust cover 68 of the same type of material, a magnetically shielded compartment 69. Cover 68 is secured by screws 70 to the horizontally extending flanges 59 and 60 of the base panel 58.

2,185,562

A tube compartment 72 is provided on the front or exterior face of the front panel 54 and comprises a horizontal base plate 73, secured to panel 54, and a cover 74 hinged at 75 to plate 73. Any suitable latch arrangement (not shown) may be provided to hold the cover 74 in normally closed position. Tubes 76 are provided in compartment 72 and are carried by means of sockets 77 supported by base plate 73. Electrical conductors, such as wires 78 and 79, extend from the terminals of tubes 76, through suitably insulated apertures in panel 54 to the rear or terminal side thereof. Terminal blocks 80 and 81 similar to those of 44 and 48 (Figs. 1 and 2) have terminals 82 and 83, respectively, provided thereon and are supported in spaced relation by the panels 54 and 58, respectively. Electrical conductors 85 are provided between the various terminals as at 86 and 87 on the terminal side of panel 54 and the various terminals 82 on terminal block 80. Similar electrical conductors 88 are provided between the various electrical terminals 67 on the terminal side of panel 58 and the various terminals 83 on terminal block 81. Flexible conductors 89 are provided between each of the corresponding terminals 82 and 83 to electrically connect the various elements 65 and 66 with the tubes 76, or other apparatus carried by the front panel 54.

In order to automatically open desired circuits, such as the high voltage plate circuits of tubes 76, within the terminal compartment 64, formed by the base panel 58 and front panel 54, and within the tube compartment 72 when either of these two compartments is opened, an automatic switch arrangement, generally indicated at 92 is provided. This arrangement 92 comprises a switch 93 connected with any desired circuit within either of the compartments 72, or 64. Switch 93 is supported by a bracket 94 carried by the base panel 58. Bracket 94 also supports a manually operable switch 95 which extends through an aperture 96 formed in the front panel 54. As shown in Fig. 5 a pivotal lever 97, adapted to operate the switch 93, is pivotally connected at its lower end to a plunger rod 98. Rod 98 is slidably fitted at its forward end within a sleeve member 99 and abuts against a compression spring 100 provided within the sleeve 99. Sleeve 99 is slidable within a bearing formed in a bracket 101 depending from the switch supporting bracket 94. The forward end of sleeve member 99 extends through an aperture 102 in the front panel 54 and is adapted to be engaged by the upper edge of the folding cover 74. When both the front cover 54 and the tube cover 74 are in their normal closed position, as shown in Figs. 4 and 5, the lever 97 will be held in a retracted position, thus closing any circuit in which the switch 93 is placed. Whenever either the front cover 54 or the tube cover 74 is opened, the sleeve 99, rod 98 and lever 97 are permitted to be advanced by any suitable spring mechanism such as tension spring 103 within the switch 93, thus opening any and all circuits in which switch 93 is provided. Spring 100 prevents injury to the switch 93 due to rapid closing of either of the covers 54 or 74.

I claim:

1. A mounting for vacuum tube apparatus including elements capable of producing magnetic fields exteriorly thereof and elements susceptible of being deleteriously affected by said magnetic fields, comprising a pair of spaced vertical panels, said magnetic field producing elements extending to one side of one of said panels and having the electric terminals thereof extending from the opposite side of said panel, said panel having a relatively high magnetic permeability, said susceptible elements extending to one side of the other of said panels and having the electric terminals thereof extending on the opposite side of said last mentioned panel, the terminal sides of said panels facing each other, and electrical connections between the terminals of said two panels.

2. A mounting in accordance with claim 1 comprising a cover of relatively high magnetic permeability substantially enclosing the side of said panel from which said magnetic field producing elements extend.

3. A mounting in accordance with claim 1 comprising a cover of relatively high magnetic permeability substantially enclosing the side of said panel from which said magnetic field producing elements extend and wherein said panel carrying said susceptible elements has a relatively low magnetic permeability.

4. A mounting for an electrical apparatus comprising a pair of spaced vertical supports, a vertical base panel carried by said supports, said panel being of relatively high permeability, a movable panel carried by said supports in spaced relation with said base panel, said movable panel being of relatively low permeability, said movable panel being pivoted about a horizontal axis adjacent the lower edge thereof, a plurality of field susceptible electrical devices extending from one side of said movable panel and having the electrical terminals therefor extending on the opposite side of said movable panel, a plurality of field producing electrical devices extending from one side of said base panel and having the electrical terminals therefor extending on the opposite side of said base panel, said terminal sides of said panels facing each other, a stationary terminal block electrically connected to said terminals of said electrical devices on said base panel, a second terminal block carried by said movable panel and electrically connected to said terminals of said electrical devices on said movable panel, and flexible electrical connections between said terminal blocks.

5. A mounting for electrical apparatus comprising a pair of spaced vertical supports, a pair of normally parallel panels carried in spaced relation by said supports to form a compartment, one of said panels being pivoted about an axis adjacent the lower edge thereof and of relatively low permeability, electrical apparatus extending from the exterior face of said pivoted panel and having the electrical terminals thereof extending into said compartment, electrical apparatus on the exterior face of the other of said panels, said last-mentioned electrical apparatus being capable of producing magnetic fields exteriorly thereof and having the electrical terminals thereof extending into said compartment, said last mentioned panel having a relatively high magnetic permeability, a terminal block carried by said pivoted panel adjacent the pivotal axis therefor, electrical connections between said terminals of said electrical apparatus on said pivoted panel and said terminal block, a second terminal block, electrical connections between said terminals of said magnetic field producing electrical apparatus and said second terminal block, flexible electric connections between said terminal blocks and a cover of relatively high permeability enclosing the outer face of said panel carrying said field producing electrical apparatus.

6. A mounting for electrical apparatus comprising a pair of spaced vertical panels, means for removably mounting said panels in face to face relation, power supply elements, a plurality of elements susceptible to magnetic fields, means for supporting said power supply elements on the exterior face of one of said panels, means for supporting the rest of said elements on the exterior face of the other of said panels, the electric terminals of the respective elements extending from the inner faces of the respective panels, and conductors between the terminals on one panel and the terminals on the other panel.

7. A mounting for electrical apparatus comprising a support, a pair of normally parallel panels carried in vertical spaced relation by said support to form a compartment, one of said panels being pivoted about an axis adjacent one edge thereof and of relatively low permeability, electrical elements susceptible to magnetic fields extending from the exterior face of said pivoted panel, and having the electrical terminals thereof extending from the inner face of said panel, power pack elements extending from the exterior face of the other of said panels and having the electrical terminals thereof extending from the inner face of said last mentioned panel, a terminal block carried by said pivoted panel adjacent the pivotal axis thereof, electrical connections between said terminals on said pivoted panel and said terminal block, a second terminal block, electrical connections between said terminals on the other of said panels and said second terminal block and flexible conductors between said terminal blocks.

JOHN F. NIELSEN.